United States Patent
Kneepkens et al.

[11] Patent Number: 6,014,415
[45] Date of Patent: *Jan. 11, 2000

[54] TRANSMISSION SYSTEM HAVING RECEIVER FOR RECOVERING WORDS FROM SEQUENCE OF SYMBOLS

[75] Inventors: Franciscus A. Kneepkens; Pieter G. Van Leeuwen, both of Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/768,348

[22] Filed: Dec. 17, 1996

[30] Foreign Application Priority Data

Dec. 22, 1995 [EP] European Pat. Off. .............. 95203606

[51] Int. Cl.[7] .................................. H04L 7/00; H04J 3/06
[52] U.S. Cl. ........................................... 375/368; 370/514

[58] Field of Search .................................... 375/360, 364, 375/365, 368; 370/510, 514, 515

[56] References Cited

U.S. PATENT DOCUMENTS

| | | | |
|---|---|---|---|
| 4,541,104 | 9/1985 | Hirosaki | 375/365 |
| 4,955,037 | 9/1990 | Anderson et al. | 375/244 |
| 5,509,036 | 4/1996 | Nakata | 375/368 |

*Primary Examiner*—Stephen Chin
*Assistant Examiner*—Albert Park
*Attorney, Agent, or Firm*—Jack D. Slobod

[57] ABSTRACT

In a transmission system a sequence of digital symbols including concatenated words, is transmitted by a transmitter (2) via a transmission medium (14) to a receiver (16). In order to reduce the transmission capacity no word synchronizing symbols are introduced in the sequence of digital symbols. In order to achieve word synchronization, a synchronization processor estimates the probability function of one single predetermined string as function of the position of the string in the sequence. The correct position of the words is derived from this probability function.

15 Claims, 5 Drawing Sheets

TRANSMISSION SYSTEM HAVING RECEIVER FOR RECOVERING WORDS FROM SEQUENCE OF SYMBOLS

BACKGROUND OF THE INVENTION

1. Field of the Invention

The invention is related to a transmission system comprising a transmitter for transmitting a sequence of words comprising digital symbols via a transmission medium to a receiver, said receiver comprises means for recovering words comprising digital symbols from said sequence. The invention is also related to a receiver, an arrangement and a method to be used in relation with the above mentioned transmission system.

2. Description of the Related Art

A transmission system according to the preamble is known from U.S. Pat. No. 4,955,037.

Such transmission system can e.g. be applied for the transmission of audio or video signals in digital form via the public telephone network, or for the transmission of such signals in mobile radio systems. Said transmission systems can also be used for the recording and reproduction of digital symbols using magnetic tapes or magnetic discs such as hard discs or floppy discs. Said transmission system can also be used with optical or opto-magnetic discs.

In order to transmit signals in digital form, often words of digital symbols are formed, which words have to be transmitted via the transmission medium or have to be recorded on a recording medium. The words of digital symbols are generally transmitted/recorded in serial form on the respective medium.

In order to recover the words of digital symbols the position of the word boundaries in the received sequence has to be found. A first method to enable recovery of the words from the sequence, is to introduce synchronisation words in the sequence of words. These synchronisation words are formed by a unique string of symbols. By analyzing the received sequence, and determining the position of the synchronisation words, the boundaries between all words in the sequence of digital symbols are known. A disadvantage of using synchronisation words is the loss of transmission capacity, because synchronisation words do not carry any payload data.

In the transmission system according to the above mentioned U.S. patent no. synchronisation words are used. For determining the boundaries between words in the sequence, a probability measure of 16 predetermined strings of digital symbols is determined as function of the value of said strings. This is done for each of a plurality of positions (8) of said 16 strings in the sequence. The correct position of the words of digital symbols is derived from the position in which the probability measure of said 16 strings approximates a predetermined function. In this way the statistical properties of the sequence of digital symbols are exploited to find the correct boundaries between the words.

The determination of the probability measures of 16 strings for 8 positions, requires a substantial amount of processing power, which leads to high costs of the transmission system.

OBJECT AND SUMMARY OF THE INVENTION

The object of the present invention is to provide a transmission system according to the preamble in which the processing power required for the word synchronisation is substantially reduced.

Therefor the transmission system according to the invention is characterised in that the receiver comprises probability determining means for determining a probability function representing a measure for the probability of occurrence of one predetermined string of digital symbols as function of the relative position of said string in the sequence, the receiver further comprises word synchronising means for deriving the position of the words in the sequence from said probability function.

Experiments have shown that it is possible to derive the position of the words in the sequence from the probability of one single string of digital symbols as function of the position of said string in the sequence. Having only to determine a probability function for one single string instead of 16 strings results in a substantial reduction of the required processing power.

An embodiment of the invention is characterised in that said string is a string not occurring within valid words of digital symbols.

By using a string not occurring within valid words, a pronounced probability function is found, from which easily the position of the words within the sequence of digital symbols can be found.

A further embodiment of the invention is characterised in that the word synchronising means are arranged for deriving the position from the words from the position of a single peak in the probability function.

For certain signals it has turned out that the probability function is represented by one single peak. In such a case the position of the word can directly be derived from the position of said peak.

BRIEF DESCRIPTION OF THE DRAWING

The invention will now be explained in more detail with reference to the drawings, wherein.

DETAILED DESCRIPTION OF THE PREFERRED EMBODIMENTS

Figure 1:
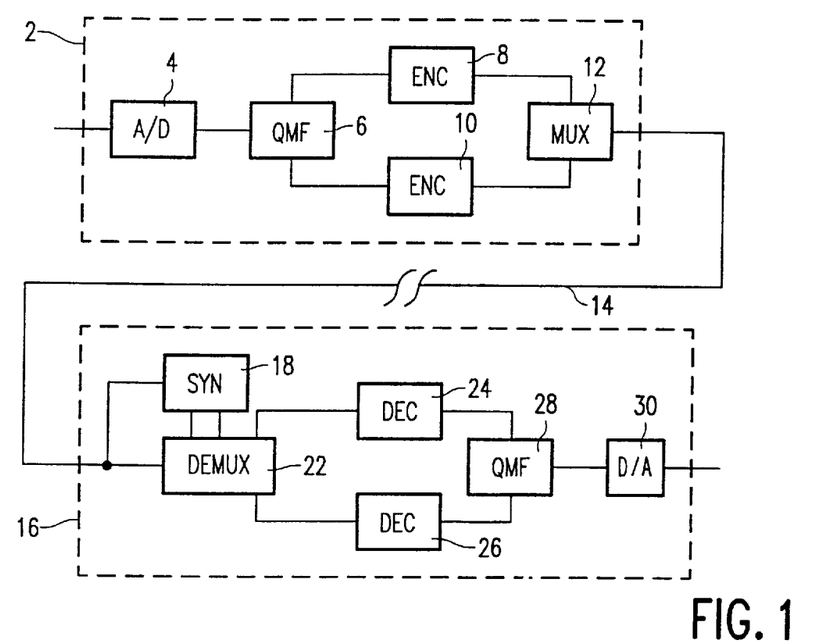
FIG. 1 shows a transmission system according to the invention.

In the transmission system according to FIG. 1 the signal to be transmitted is applied to an input of a transmitter 2. The input of the transmitter 2 is connected to an input of an A/D converter 4. The output of the A/D converter 4 is connected to an input of a quadrature mirror filter 6. A first output of the quadrature mirror filter 6 is connected to an input of a first encoder 8. A second output of the quadrature mirror filter 6 is connected to an input of a second encoder 10. The output of the encoder 8 is connected to a first input of a multiplexer 12. The output of the encoder 10 is connected to a second input of the multiplexer 12. At the output of the multiplexer 12 the sequence of words comprising digital symbols is available. This sequence is transmitted by the transmitter 2 to the receiver 16 via the transmission medium 14.

In the receiver 16, the received sequence of digital words is applied to an input of a demultiplexer 22 and to an input of a synchronisation processor 18. The synchronisation processor 18 comprises the probability determining means and the word synchronising means according to the inventive concept. A clock output and a word synchronisation output of the synchronisation processor 18 are connected to the demultiplexer 22. A first output of the demultiplexer 22 is connected to an input of a first decoder 24 and a second output of the demultiplexer 22 is connected to an input of a second decoder 26. The output of the first decoder 24 is connected to a first input of a quadrature mirror filter 28. The output of the second decoder 26 is connected to a second input of the quadrature mirror filter 28. The output of the quadrature mirror filter 28 is connected to a D/A converter 30. At the output of the D/A converter 30 the signal to be transmitted is available.

In the following it is assumed that the signal at the input of the A/D converter 4 is a wide band speech signal having a bandwidth of 7 kHz. However, the scope of the invention is not limited to speech signals, but comprises other types of signals as well.

The input signal of the transmitter is converted to a digital signal by the A/D converter 4. A sample frequency of 16 kHz is used. The output signal of the A/D converter 4 is separated into two subband signals by the quadrature mirror filter 6. The first subband has a frequency range from 0–4 kHz, and the second subband has a range from 4–8 kHz. The output signals of the quadrature mirror filter 6 are available as baseband equivalent signals with a sampling rate of 8 kHz. The lower subband is encoded using ADPCM (Adaptive Differential Pulse Code Modulation) with 6 bits per sample, and the high subband is encoded using ADPCM with 2 bits per sample. The output signals are combined to 8 bit words by the multiplexer 12. More details about the coding of the input signal can be found in "7 kHz Audio Coding Within 64 kbit/s", CCITT Recommendation G.722, which is incorporated by reference herein.

The output signal of the multiplexer 12 is transmitted in serial form to the receiver 16 via the transmission medium 14. In the receiver 16, the synchronisation processor 18 determines the position of the words in the sequence of received symbols. Using this position, the demultiplexer 22 recovers the ADPCM coded signals representing the lower subband and the high subband. The decoders 24 and 26 reconstruct the subband signals from the coded signals at their respective inputs. These subband signals are combined to a reconstructed speech signal by the quadrature mirror filter 28. The output signal of the quadrature mirror filter 28 is converted into an analog speech signal by the D/A converter 30.

Figure 2:
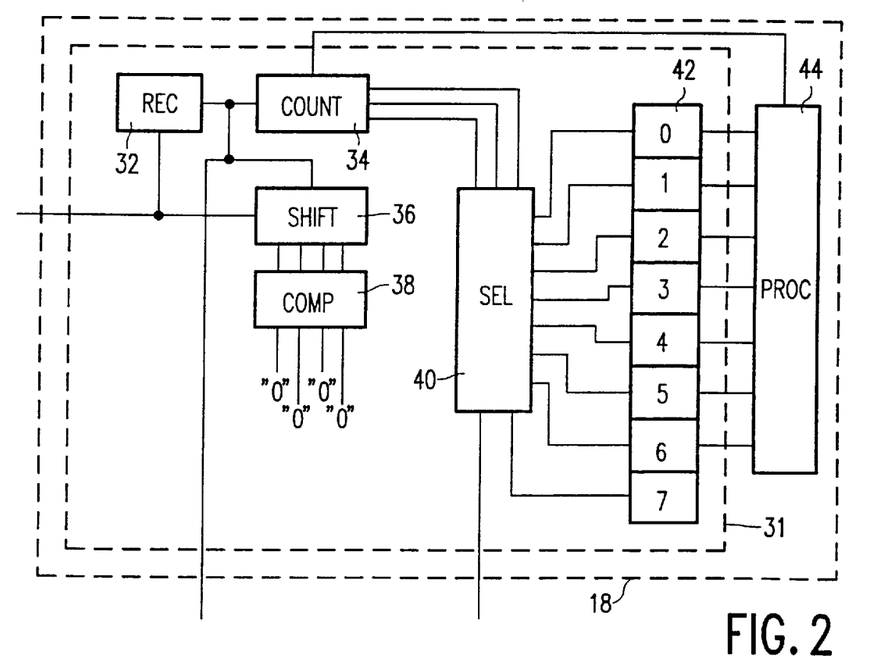
FIG. 2 shows an embodiment of the means for determining the probability function.
Figure 3A:
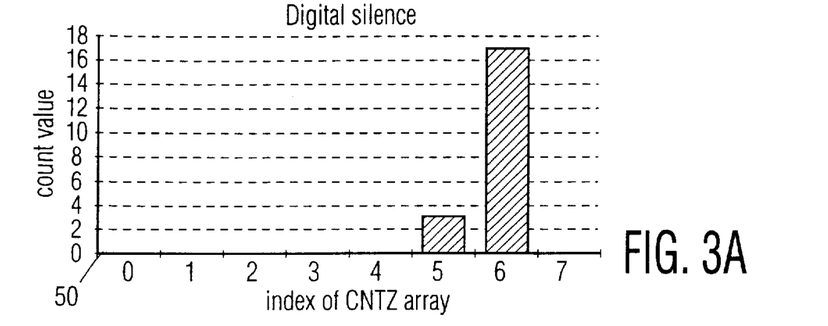
FIG. 3 shows the probability function for a plurality of signal types.
Figure 3B:
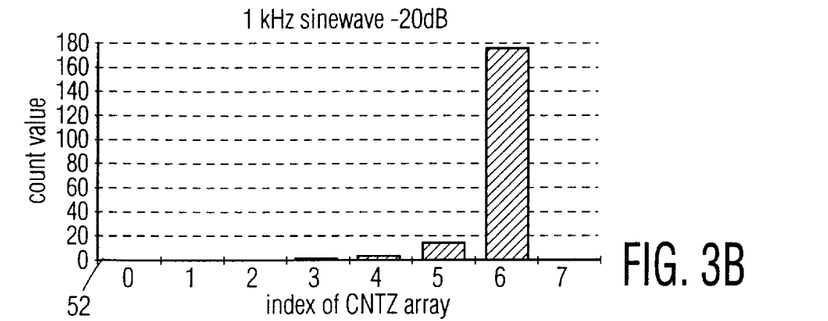
Figure 3C:
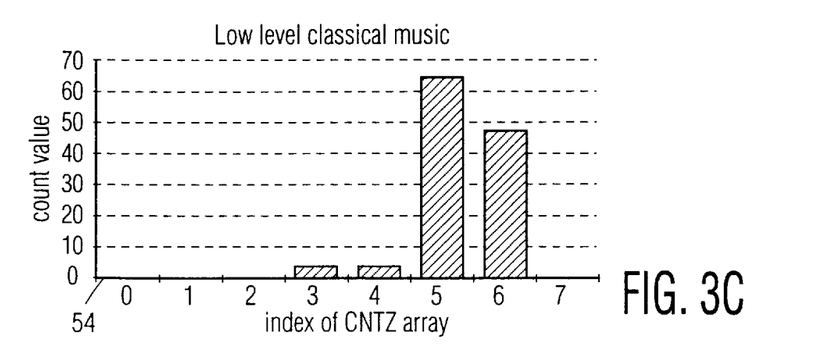
Figure 3D:
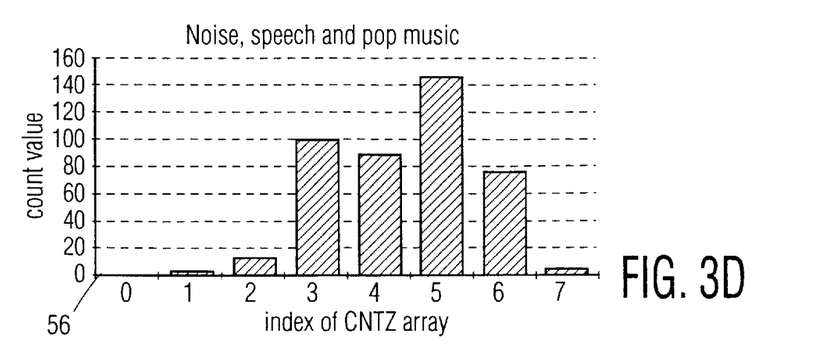

In the synchronisation processor 18, the input signal is connected to the probability determining means 31. The input signal of the probability determining means 31 is connected to a clock recovery arrangement 32 and to a shift register 36. The output of the clock recovery arrangement 32, carrying a bit clock signal is connected to an input of a modulo M counter 34, M being the number of bits in a word. The output of the clock recovery arrangement 32 is also connected to a first output of the synchronisation processor 18 for providing the bit clock to the demultiplexer 22 and to a clock input of the shift register 36. Four parallel outputs of the shift register 36 are connected to four inputs of a comparator 38. Four signals representing the predetermined string, being here "0000", are applied to four further inputs of the comparator 38.

An output of the comparator 38 is connected to an input of a selection switch 40. Three outputs of the counter 34 are connected to three control inputs of the selection switch 40. Each of M outputs (here M=8) of the selection switch 40 are connected to a corresponding counter 0 . . . 7 of a counter bank 42. A further output of the selection switch indicating the beginning of a new word, is connected to a second output of the synchronisation processor 18, for providing the demultiplexer 22 with a word synchronisation signal. The output of each of the counters 0 . . . 7 of the counter bank 42 is connected to a corresponding input of the word synchronising means, being here a processor 44. An output of the processor 44 is connected to an input of the counter 34.

The clock recovery arrangement 32 derives from the input signal of the synchronisation processor 18 a clock signal representative of the bit clock of the input signal. This clock signal is used to clock the shift register 36 and to increment the modulo M counter 34. At every clock pulse, the signal present in the shift register 36 is compared with the predetermined string "0000". Each time the signal present in the shift register 36 equals "0000", the output of the comparator carries an active level "1". The three output signals of the counter 34 cause the selecting switch to pass the output signal from the comparator 38 to a selected counter of the counter bank 42. Each time the output of the comparator 38 is "1" the count of the selected counter in the counter bank 42 is increased. Each time the counter 0 is addressed, the selection switch 40 issues a word synchronising signal at its further output. The counters of the counter bank 42 are selected cyclically. In this way the occurrence of the string "0000" is counted as function of the position of said string in the sequence of digital symbols. The content of the counters of the counter bank 42 represent the probability function. The count value of each counter represent the probability value, and the number of the counter (0 . . 7) represents the position of the string in the sequence of digital symbols.

The processor 44 derives the position of the words from the content of the counter bank, and issues a so called shift signal. The evaluation of the counters is done after a predetermined period of time or when one of the counters reaches its maximum count, whatever happens first. The shift signal indicates that the word synchronising signal has to be shifted over a plurality of bit periods. This shift is achieved by subtracting the shift value from the content of the counter 34.

By subtracting the shift value from the content of the counter 34 the instant on which the counter 0 in the counter bank 42 is selected will shift over the shift value, and consequently also the word synchronising signal will be shifted over the shift value.

Graph 50 in FIG. 3 shows the probability function for a zero value signal (silence) with correct word alignment. This signal was measured during 0.5 seconds. It can be seen that in the case of silence a large peak for N=6 is present and a small peak for N=5 is present. Graph 52 shows the probability function for a 1 kHz sine wave signal with a level 20 dB below the maximum level. Again there is a large peak for N=6 and a small peak for N=5. Graph 54 shows the probability function for low level classical music. Here there is a large peak for N=5 and a somewhat smaller peak for N=6. In graph 56, finally the probability function is given for noise, speech and pop music is given. There exist almost no differences between the probability functions for these three kinds of sound. From graph 56 it can be seen that the probability function comprises four consecutive peaks for N=3,4,5, and 6.

The presence of said three different signal profiles can be used for finding the position of the words within the sequence of symbols. First it is analysed which profile matches the probability function measured. After that the shift value is determined, which is calculated from the difference between the actual position of the probability function and the correct position of the probability function according to FIG. 3.

Figure 4:
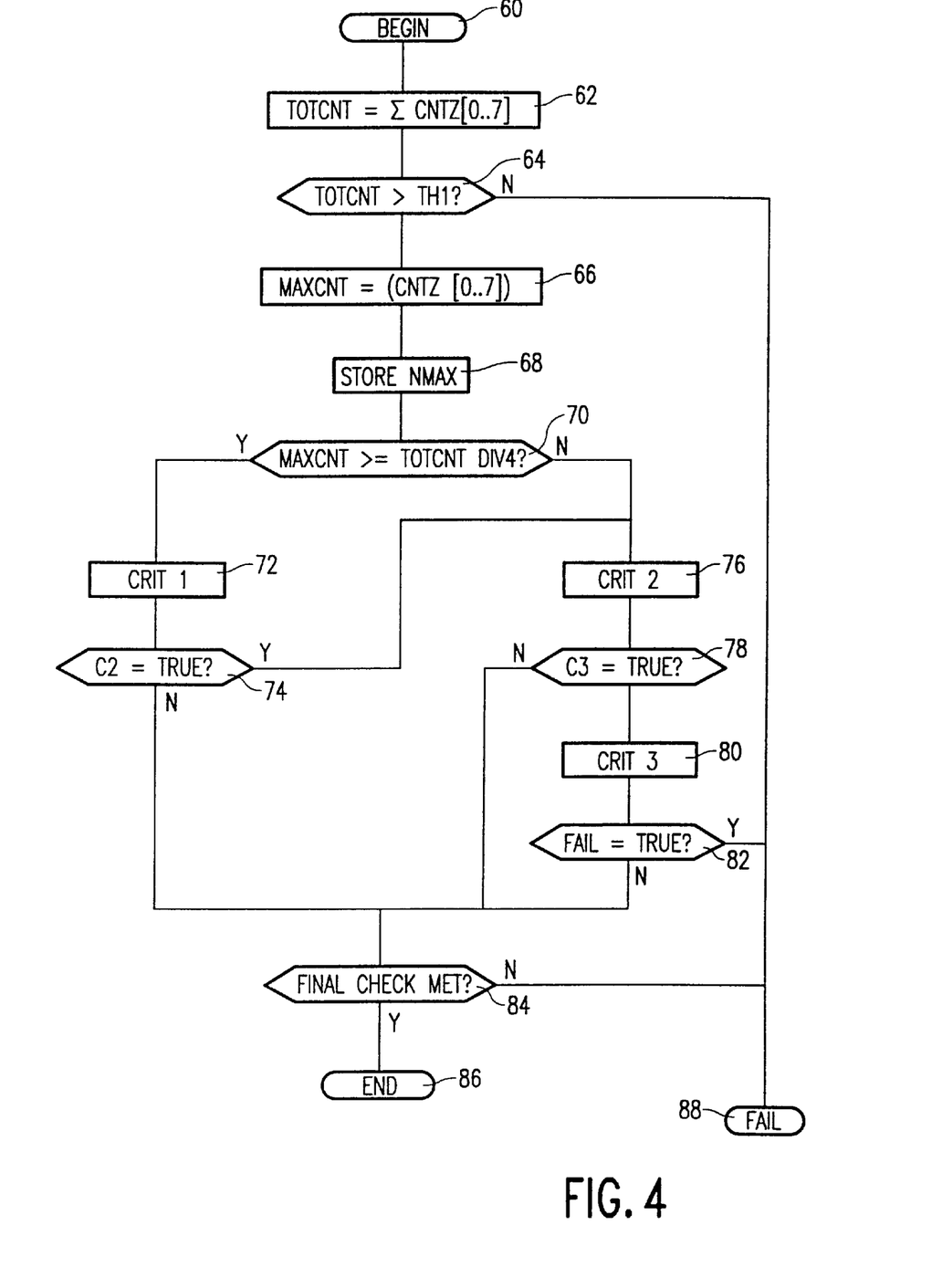
FIG. 4 shows a flow diagram of a program for a digital processor for implementing the function of the synchronisation means.

In the flow graph according to FIG. 4 the labelled instructions have the meaning as follows.

| No. | Inscript | Meaning |
|---|---|---|
| 60 | BEGIN | Initialisation of variables. |
| 62 | TOTCNT=ΣCNTZ[0 . . . 7] | The sum of the counts of all counters from the counter bank 42 is calculated. |
| 64 | TOTCNT > TH1 ? | It is checked whether the sum is larger than a threshold TH1. |
| 66 | MAXCNT=MAX(CNTZ[0 . . . 7] | The value of the largest peak is determined |
| 68 | STORE NMAX | The position of the largest peak is stored. |
| 70 | MAXCNT ≧ TOTCNT DIV 4? | It is checked whether the largest peak is at least ¼ of the total count |
| 72 | CRIT 1 | The probability function is checked against a first criterion. |
| 74 | C2 = TRUE? | It is checked whether a test of the probability function against a second criterion is necessary. |
| 76 | CRIT 2 | The probability function is checked against the second criterion. |
| 78 | C3 = TRUE ? | It is checked whether a test of the probability function against a third criterion is necessary. |
| 80 | CRIT 3 | The probability function is checked against the third criterion. |
| 82 | FAIL = TRUE ? | It is checked whether one of the three criteria is met. |
| 84 | FINAL CHECK MET ? | A final check is made. |
| 86 | END | End of the program with synchronisation achieved. |
| 88 | FAIL | End of the program without synchronisation achieved. |

In instruction 60 the program is started with the initialisation of all variables used. In instruction 62 the sum of the content of all counters in the counter bank 42 is calculated. In instruction 64 the sum calculated in instruction 64 is compared with a threshold TH1. If the total count is smaller than the threshold TH1, the measurement is regarded as not reliable, and the program is ended by jumping to instruction 88. Otherwise the program is continued with instruction 66. In instruction 66 the maximum count values is determined, and in instruction 68 the value of N corresponding to said maximum count value is stored.

In instruction 70 it is checked whether the maximum count value is larger than ¼ the total count. If so, it is regarded as likely that one single peak is present, and a check according to the first criterion is performed. If the maximum count is smaller than ¼ of the total count it is regarded impossible that only one single peak is present, and the program is continued at instruction 76.

In instruction 72 it is checked whether the probability function meets the first criterion. The first criterion is met if the probability function comprises a single major peak. This corresponds to the graphs 50 and 52 in FIG. 3. In instruction 74 it is checked whether the probability function meets criterion 1. The value of C2 is only set to the value "TRUE" if the first criterion is not met. If the first criterion is met, the program continues with instruction 84 for a final check. Otherwise the program continues with instruction 76

In instruction 76 it is checked whether the second criterion is met. The second criterion is met if the probability function comprises two substantial peaks, corresponding to the probability function according to graph 54 of FIG. 3.

In instruction 78 it is checked whether the probability function meets the second criterion. The value of C3 is only set to the value "TRUE" if the second criterion is not met. If the second criterion is met, the program continues with instruction 84 for a final check. Otherwise the program continues with instruction 80. In instruction 80 it is checked whether the third criterion is met. The third criterion is met if the probability function comprises four subsequent peaks according to graph 56 in FIG. 3. In instruction 82 it is checked whether the third criterion is met. If not, the program terminates with instruction 88. If the third criterion is met, a final check is performed. This final check comprises the check whether the probability function CNTZ[SHIFT] is very low, because the string "0000" may not occur in a correctly aligned word. If the final test is not met the program terminates with instruction 88, and if the final test is met, the program terminates with instruction 86.

Figure 5:
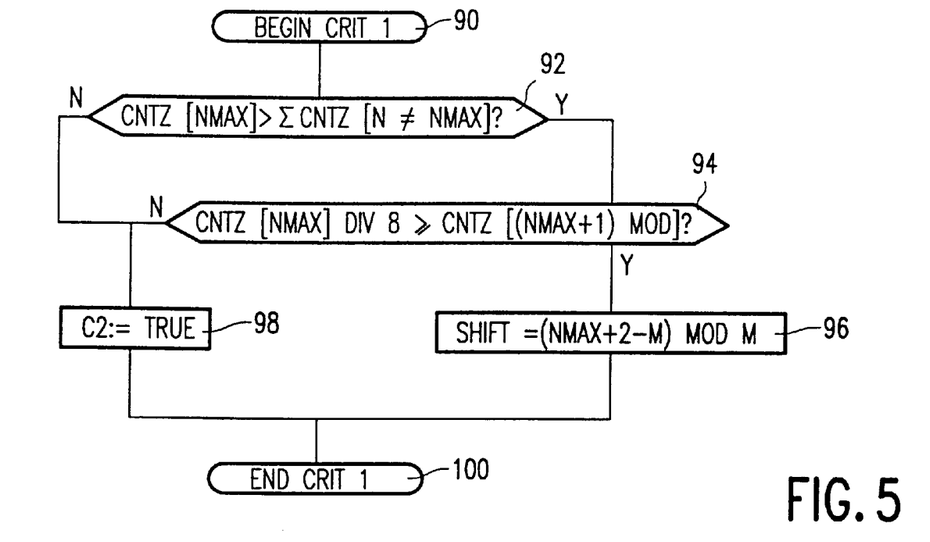
FIG. 5 shows a flow diagram of a subroutine for checking a first criterion of the probability function.

In the flow graph according to FIG. 5 the labelled instructions have the meaning as follows.

| No. | Inscript | Meaning |
|---|---|---|
| 90 | BEGIN CRIT1 | The evaluation of the first criterion is started. |
| 92 | CNTZ[NMAX]>ΣCNTZ[N≠NMAX] | The largest peak is compared to sum of remaining peaks. |
| 94 | CNTZ[NMAX] DIV 8 ≧ CNTZ[(NMAX+1) MOD M] | Is there a significant peak to the right from the largest peak ? |
| 96 | SHIFT=(NMAX+2−M) MOD M | The SHIFT is calculation from the position of the largest peak. |
| 98 | C2 = TRUE | The C2 flag is set. |
| 100 | END CRIT1 | The evaluation of criterion 1 is finished. |

In instruction 90 the evaluation of the first criterion is started. In instruction 92 it is checked whether the largest peak is larger than the sum of the rest of the counter values. If this is not the case, it is assumed that more than one substantial peak is present and the program is continued at instruction 98. Otherwise the program is continued with instruction 94. In instruction 94 it is checked whether the largest peak is at least 8 times larger than the value to the right of it. It is observed that in case NMAX=7, the largest peak is compared with the value at N=0. This is because of the "wrap around" due the modulo operation.

If the largest peak is not at least 8 times larger than the value to the right of it, the first criterion is not met and the program continues with instruction 98. Otherwise the first criterion is met, and the shift value is calculated in instruction 96. The calculation of the shift is based on the recognition that in case the first criterion is met, the largest peak should occur at N=6. It can be seen that for M=8 the value for shift is zero if the probability function corresponds to graph 50 or 52 (NMAX=6). After the execution of instruction 96 or 98 the program is terminated with instruction 100.

Figure 6:
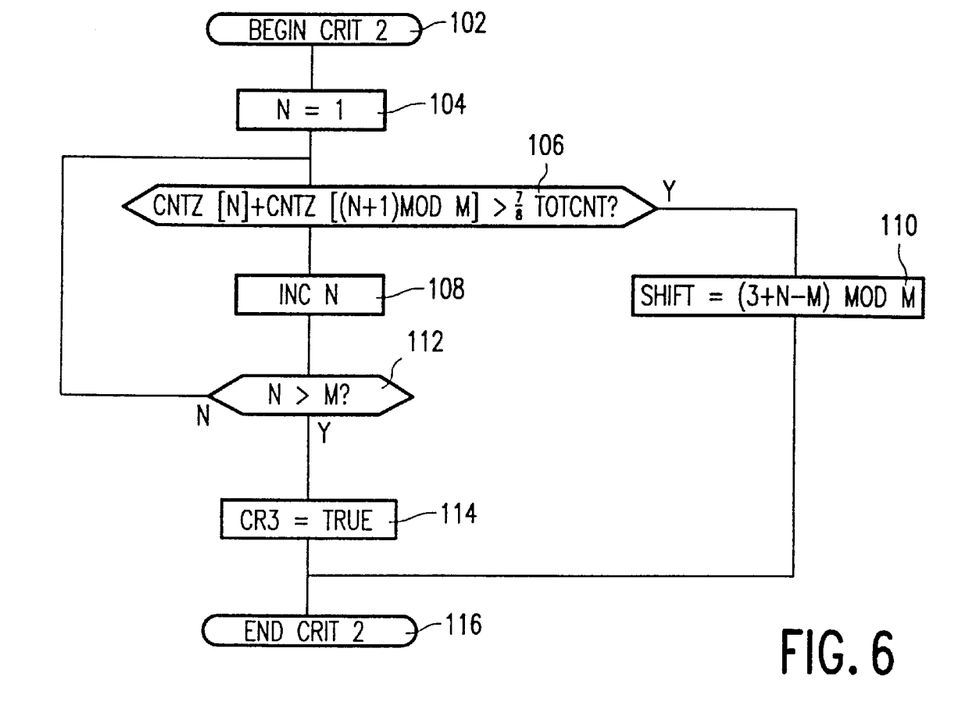
FIG. 6 shows a flow diagram of a subroutine for checking a second criterion of the probability function.

In the flow graph according to FIG. 6 the labelled instructions have the meaning as follows.

| No. | Inscript | Meaning |
|---|---|---|
| 102 | BEGIN CRIT2 | The evaluation of the second criterion is started. |
| 104 | N=1 | The value of N is initialised to 1. |
| 106 | CNTZ[N]+CNTZ[(N+1) MOD M] > ⅞ · TOTCNT ? | It is checked whether the sum of CNTZ[N] and CNTZ[N+1] is larger than ⅞ · TOTCNT. |
| 108 | INC N | The value of N is incremented. |
| 110 | SHIFT=(N+3−M) MOD M | The value of the shift is calculated from the value of N. |
| 112 | N > M ? | It is checked whether the test according to instruction 106 has been performed for all relevant values of N. |
| 114 | C3 = TRUE | The C3 flag is set. |
| 116 | END CRIT2 | The evaluation of the second criterion is finished. |

In instruction 102 the evaluation of the second criterion is started. In instruction 104 N is initialised to 1. In instruction 106 the sum of CNTZ[1] and CNTZ[2] is compared with ⅞·TOTCNT. If this condition is met, the probability function comprises two significant peaks according to graph 54 in FIG. 3. In this case the program continues with instruction 110, where the value of the shift is calculated according to the principle explained above. After instruction 110 the program is terminated with instruction 116.

If the condition according to instruction 106 is not met, the value of N is incremented in instruction 101. In instruction 112 it is checked whether instruction 106 has been executed for all relevant values of N. If not, the program continues at instruction 106 with the next value of N. Otherwise the flag CR3 is set in instruction 114 in order to indicate that the second criterion is not met and the third criterion has to be checked. The program is terminated with instruction 116.

Figure 7:
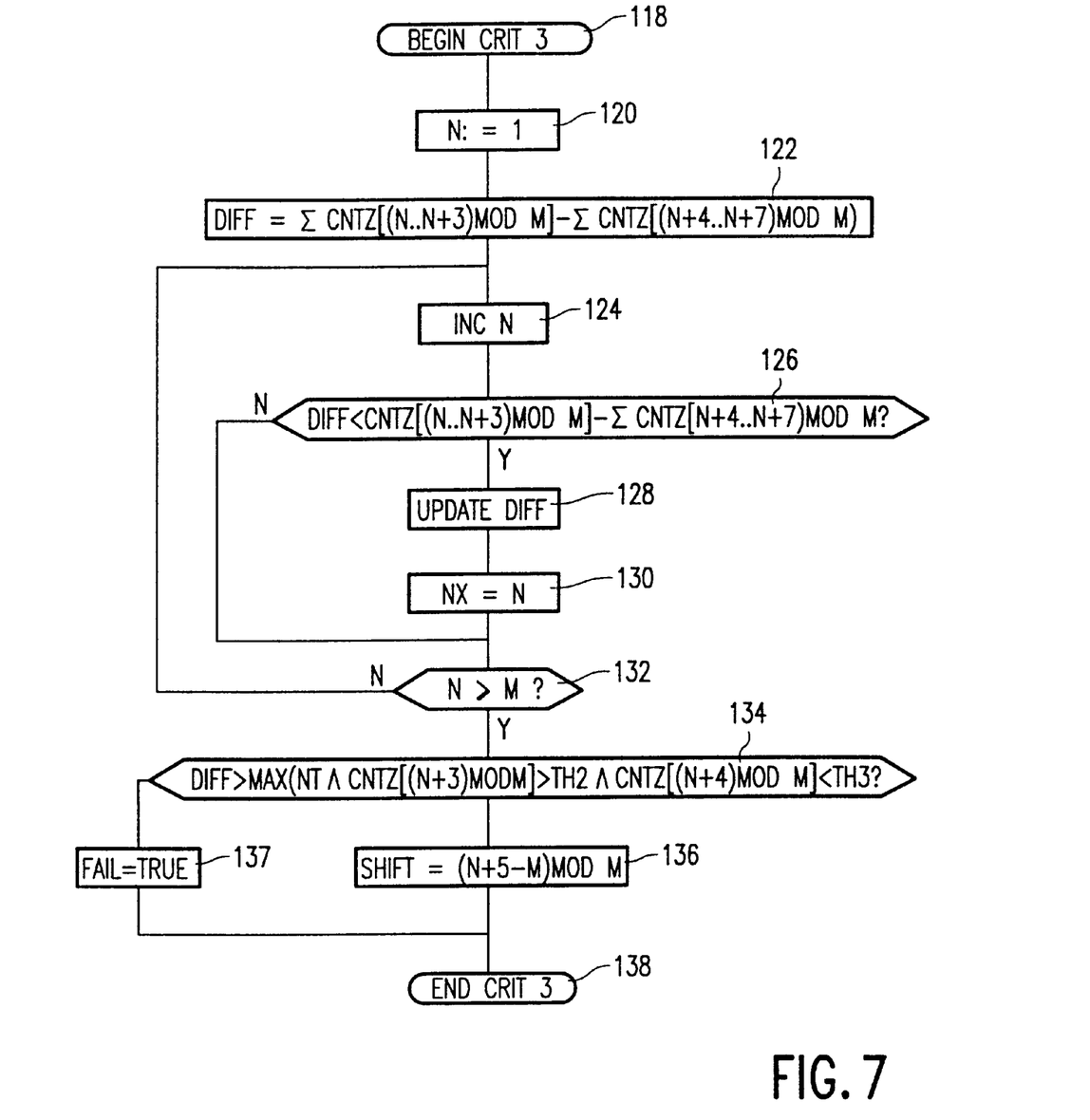
FIG. 7 shows a flow diagram of a subroutine for checking a third criterion of the probability function.

In the flow graph according to FIG. 7 the inscripts have the meaning as follows.

| No. | Inscript | Meaning |
|---|---|---|
| 118 | BEGIN CRIT3 | The evaluation of the third criterion is started. |
| 120 | N=1 | The value of N is initialised to 1. |
| 122 | DIFF=ΣCNTZ[(N . . . N+3) MOD M] − ΣCNTZ[(N+4 . . . N+7) MOD M] | It is checked whether the sum of CNTZ[N] and CNTZ[N+1] is larger than ⅞ · TOTCNT. |
| 124 | INC N | The value of N is incremented. |
| 126 | DIFF < ΣCNTZ[(N . . . N+3) MOD M] − ΣCNTZ[(N+4 . . . N+7) MOD M] ? | Is the new value of DIFF larger than the old value ? |
| 128 | UPDATE DIFF | The value of DIFF is updated. |
| 130 | NX = N | The value of N for which the maximum value of DIFF is found is stored. |
| 132 | N ≧ M ? | All relevant values of N checked ? |
| 134 | DIFF>MAXCNT ∧ CNTZ[(NX+3) MOD M] > TH2 ∧ CNTZ[(NX+4) MOD M] < TH3 ? | Is the third criterion met ? |
| 136 | SHIFT = (N+5−M) MOD M | The value if the shift is calculated. |
| 137 | FAIL = TRUE | The third criterion is not met. |
| 138 | END CRIT3 | The evaluation of the third criterion is finished successfully. |

The third criterion corresponds to graph 56 of FIG. 3. The third criterion is met if the probability function contains four subsequent peaks. The position of said peaks can be found by maximising the difference between a first sum and a second sum. The first sum is calculated over four subsequent function values, and the second sum is calculated over the remaining function values. The maximum value of the difference will occur for the position in which the first sum is calculated over the four peaks of the probability function according to graph 56 in FIG. 3.

In instruction 118 the evaluation of the third criterion is started. In instruction 120, N is initialised to 1. In instruction 122 the difference between the first and the second sum is calculated. The first sum is calculated over the first four counter values and the second sum is calculated over the remaining four counter values. In instruction 124 the value of N is incremented. In instruction 126 the previously calculated difference value is compared with a newly calculated difference value with incremented N. If the newly calculated difference is larger than the previously difference value, the value of DIFF is set to the newly calculated value in instruction 128. In instruction 130 the value of N corresponding to said newly calculated difference value is stored. In instruction 132 it is checked whether all relevant values of N have been tried.

If all values of N have been tried, a test is carried out in instruction 134. In order to meet the third criterion, three conditions have to be fulfilled. The maximum value of DIFF must be larger than the largest peak, the value of the peak at NX+3 must be larger than a threshold TH2 and the (small) value at NX+4 must be smaller than a threshold TH3. If these conditions are fulfilled, the third criterion is met, and the shift value is calculated in instruction 136 and the program is terminated in instruction 138. If the third criterion is not met, the flag FAIL is set in instruction 137 and the program is terminated with instruction 137.

It is observed that it is easy to supervise correct word alignment and to check whether there is still a predetermined input signal present. One can check whether the count of counter 0 remains very low. If the count of counter 0 increases rapidly, the word synchronisation is lost, or the type of signal at the input is changed. If in such a situation resynchronisation fails, it can be concluded that a different signal type with different statistical properties is present at the input.

We claim:

1. A transmission system comprising a receiver and a transmitter for transmitting a sequence of words comprising digital symbols via a transmission medium to the receiver, said receiver comprising:

means for recovering words comprising digital symbols from said sequence;

probability determining means for determining a probability function represented by concurrently presented measures of the probability of occurrence of a predetermined string of digital symbols for a predetermined number, greater than two, of respective different values of relative position of said string in the sequence; and word synchronizing means for deriving the position of the words in the sequence from at least one peak in the determined probability function.

2. The transmission system according to claim 1, wherein said string is a string not occurring within valid words of digital symbols.

3. The transmission system according to claim 1, wherein the word synchronizing means are arranged for deriving the position of the words from the position of a single peak in the probability function.

4. The transmission system according to claim 2, wherein the word synchronizing means are arranged for deriving the position of the words from the position of a single peak in the probability function.

5. The transmission system according to claim 4, wherein the ratio between the probability measure represented by the peak and the sum of the probability measures for all positions is in a range from 0.3–0.7.

6. The transmission system according to claim 2, wherein the word synchronizing means are arranged for deriving the position of the words from the position of two peaks in the probability function.

7. The transmission system according to claim 6, wherein the ratio between the probability measure represented by the two peaks and the sum of the probability measures for all positions is in a range from 0.7–0.9.

8. A transmission system comprising a receiver and a transmitter for transmitting a sequence of words comprising digital symbols via a transmission medium to the receiver, said receiver comprising:

means for recovering words comprising digital symbols from said sequence;

probability determining means for determining a probability function re-presenting a measure of the probability of occurrence of one predetermined string of digital symbols as a function of and for a plurality of different values of relative position of said string in the sequence; and word sychronizing means for deriving the position of the words in the sequence from at least one peak in said probability function, wherein the ratio between the probability measure represented by the peak and the sum of the probability measures for all positions is in a range from 0.3–0.7.

9. A transmission system comprising a receiver and a transmitter for transmitting a sequence of words comprising digital symbols via a transmission medium to the receiver, said receiver comprising:

means for recovering words comprising digital symbols from said sequence;

probability determining means for determining a probability function representing a measure of the probability of occurrence of one predetermined string of digital symbols as a function of and for a plurality of different values of relative position of said string in the sequence; and word synchronizing means arranged for deriving the position of the words from the position of two peaks in the probability function.

10. The transmission system according to claim 9, wherein the ratio between the probability measure represented by the two peaks and the sum of the probability measures for all positions is in a range from 0.7–0.9.

11. A receiver for receiving a sequence of words comprising digital symbols from a medium, said receiver comprising:

means for recovering words comprising digital symbols from said sequence;

probability determining means for determining a probability function represented by concurrently presented measures of the probability of occurrence of a predetermined string of digital symbols for a predetermined number, greater than two, of respective different values of relative position of said string in the sequence; and word synchronizing means for deriving the position of the words in the sequence from a single peak in the determined probability function.

12. The receiver according to claim 11, wherein said string is a string not occurring within valid words of digital symbols.

13. An arrangement for recovering digital words from a sequence of digital symbols, said arrangement comprising:

probability determining means for determining a probability function represented by concurrently presented measures of the probability of occurrence of a predetermined string of digital symbols for a predetermined number, greater than two, of respective different values of relative position of said string in the sequence; and word synchronizing means for deriving the position of the words in the sequence from at least one peak in the determined probability function.

14. A method for recovering digital words from a sequence of serially transmitted digital words, said method comprising:

determining a probability function represented by concurrently presented measures of the probability of occurrence of a predetermined string of digital symbols for a predetermined number, greater than two, of respective different values of relative position of said string in the sequence; and deriving the position of the words in the sequence from at least one peak in the determined probability function.

15. The method according to claim 14, wherein said string is a string not occurring within valid words of digital symbols.

* * * * *